United States Patent Office 3,089,814
Patented May 14, 1963

3,089,814
PROCESS FOR THE PRODUCTION OF A CONCENTRATE OF ACTIVE SUBSTANCE FROM SENNA
Fritz Blaich, Cologne-Ehrenfeld, Germany, assignor to A. Nattermann & Cie, Cologne-Braunsfeld, Germany
No Drawing. Filed Feb. 26, 1959, Ser. No. 795,605
Claims priority, application Germany Mar. 1, 1958
6 Claims. (Cl. 167—56)

The present invention relates to a process for the production of a concentrate of active substance from senna drugs.

It is known to produce extracts of senna leaves by preparing an infusion from the shredded material with small quantities of boiling water containing alkaline substances, evaporating this infusion at reduced pressure and extracting the residue with ethanol for the removal of impurities.

According to another known process, the infusion dried at reduced pressure, is extracted, not with ethanol, but with methanol, and a crystalline active material from senna leaves is obtained by concentrating the solution so obtained.

It is further known to prepare active crystalline glucosides from senna drugs by treating the extracts of senna, for example produced by the aforementioned processes, with alkaline earth metal salts soluble in alcohol in the presence of basic-acting substances, so as to precipitate the glucosides as their alkaline earth metal salts. The precipitated alkaline earth salts of the glucosides are separated, acidified and the glucosides liberated on the basis of their different solubility.

It has been found however by biological experiments that the use of high temperature during the extraction of senna leaves has a detrimental effect on the yield of active substances. It has further been found that, during the purification of the crystalline glucosides from senna drugs, pharmacologically active substances are lost which are contained in senna leaves in addition to the sennosides. The production of concentrates of the active substance from senna drugs is, however, simpler than the production of crystalline glucosides.

According to the present invention a senna drug is extracted in the cold with an alkaline reacting solution containing alkaline earth metal ions, the liquid extract is concentrated in vacuo and the precipitated concentrate is separated and dried without the application of heat. The extraction and concentration of the liquid extract are carried out in the cold. The concentrate precipitate during the concentration of the liquid extract may be separated and dried in known manner.

The alkaline-reacting solution which contains alkaline earth ions, preferably calcium ions, may be for example a solution of an alkaline earth metal hydroxide or an alkaline earth metal salt and an alkali. Calcium hydroxide is preferably employed as the alkaline earth metal hydroxide.

Before the extraction of the senna drugs with the alkaline reacting solution of the alkaline earth metal ions, it is preferable to free the drug by extraction from the unrequired substances which lower the concentration of the active substances, e.g. from chlorophyll. This may be done by means of a solvent, e.g. a mixture of chloroform and ether.

It has also proved advantageous to macerate the senna drug with a cold alkaline reacting solution containing alkaline earth metal ions for several hours and then to wash out the active substances with cold water. The aqueous extract obtained by the washing out process is concentrated in vacuo and the precipitated concentrate of active substances is separated in the usual way. The product obtained by the process of the present invention has on chemical analysis a relatively high content of sennosides, in fact up to a maximum of 70%. Biological experiments show that the concentrate of active substance contains other active substances as well as the sennosides.

The invention will be more clearly understood by reference to the following examples which are purely illustrative. The parts referred to in the examples are parts by weight.

Example 1

250 parts of comminuted air-dried senna leaves (sennoside content 2.5–3.0%) are macerated with 1000 parts of a saturated solution of calcium hydroxide for 15 hours at room temperature and then extracted with 5000 parts of cold water at a temperature of 15° C. The extract is concentrated in vacuo (15 torr) and the light brown precipitate thereby formed is centrifuged and dried without application of heat. The concentrate of active substance so obtained, which contains about 45% of sennosides as well as about 2% of sennidines (aglycones of the sennosides), gives a yield of 11 parts. Therefore two-thirds of the amount of sennosides originally present in the drug are contained in the concentrate. The latter is a non-hygroscopic, difficultly soluble, brown mass, which can be finely powdered and made, for example, into tablets.

Example 2

250 parts of comminuted air-dried senna leaves (sennoside content 2.5–3.0%) are macerated with 750 parts of a saturated aqueous solution of magnesium hydroxide for 60 hours at room temperature and then extracted with 6500 parts of cold water. The extract is concentrated in vacuo (15 torr). The precipitate thereby formed is centrifuged and dried without application of heat. The 8 parts of the concentrate of active substance so obtained has a sennoside content of 12% and consist of a non-hygroscopic, difficultly soluble, brown mass.

Example 3

250 parts of comminuted air-dried senna leaves (sennoside content 2.5–3.0%) are macerated with a mixture of 750 parts of a saturated aqueous solution of calcium chloride and 15 parts of a 25% solution of ammonia for 36 hours at room temperature, and then extracted with 22,000 parts of cold water. The extract is concentrated in vacuo (15 torr). The precipitate thereby formed is further processed as described in Example 2. The 6 parts of the concentrate of active substances which result have a sennoside content of 11% and consist of a non-hygroscopic, difficultly soluble, brown mass.

What I claim is:

1. A process for the production of a concentrate of active substance from senna which consists essentially in the following steps: the senna is extracted in the cold with an alkaline reacting aqueous solution containing alkaline earth metal ions, the liquid extracted is concentrated in vacuo and the precipitated concentrate is separated and dried without application of heat.

2. A process as claimed in claim 1 in which said alkaline reacting solution containing alkaline earth metal ions is a solution of an alkaline earth metal hydroxide.

3. A process as claimed in claim 1 in which the alkaline earth is calcium.

4. A process as claimed in claim 1 in which the senna drug is subjected to extraction for removal of unrequired substances with a solvent before being extracted with the alkaline reacting solution containing the alkaline earth metal ions.

5. Process as claimed in claim 4 in which the solvent is a mixture of chloroform and ether.

6. A process for the production of a concentrate of active substance from senna which consists essentially in macerating senna with a cold aqueous calcium hydroxide solution, thereby forming calcium salts of senna glucosides, dissolving and washing out said salts with cold water, and concentrating said water solution so as to obtain an active precipitate containing said calcium salts.

References Cited in the file of this patent

UNITED STATES PATENTS 2,350,295    Stoll et al. _____ May 30, 1944

OTHER REFERENCES

Stoll et al: Helvetica Chimica Acta., vol. XXXII, Fasciculus VI (1949), pp. 1892–1903.